United States Patent Office 3,520,966
Patented July 21, 1970

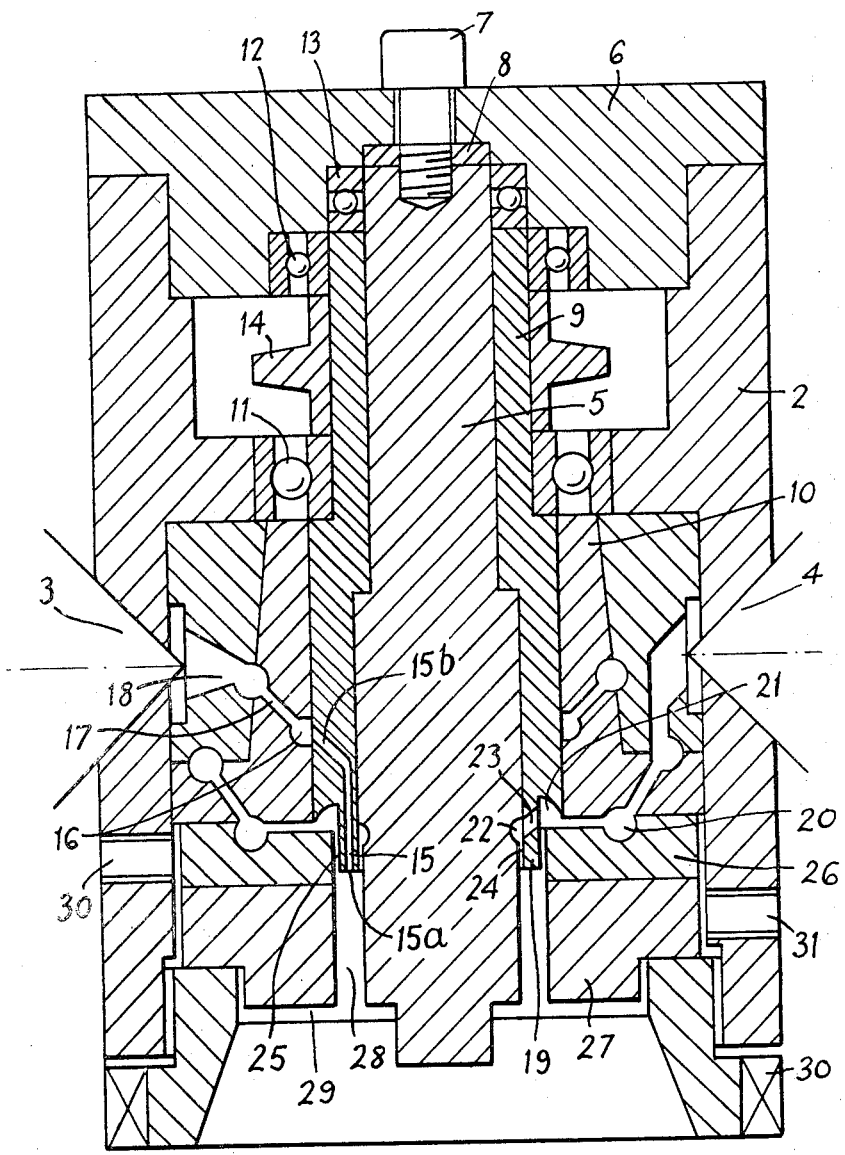

3,520,966
METHOD FOR THE MANUFACTURE OF TUBES OF PLASTICS MATERIAL
Onorato Soffiantini, Cittiglio, Italy, assignor to Induplas S.p.A., Bisuschio, Varese, Italy, an Italian company
Filed Dec. 20, 1966, Ser. No. 603,241
Claims priority, application Italy, Feb. 5, 1966, 2,583/66
Int. Cl. B29d *23/05;* B29f *3/04, 3/10*
U.S. Cl. 264—173                                              1 Claim

ABSTRACT OF THE DISCLOSURE

A method is provided for producing multilayer tubing wherein two coaxial tubes from softer plastic material are extruded while simultaneously extruding a helical reinforcement therebetween through a rotating nozzle.

---

The present invention relates to a method of and apparatus for the manufacture of tubes of plastics material with a core comprising a helical reinforcement of a stronger or more rigid plastics material, embedded in the wall of the tube. Tubes of this kind, in addition to having high mechanical strength characteristics, are also flexible and noncompressible.

The method according to the present invention consists in continuously extruding the plastics material forming the tube wall through two concentric annular nozzles, in the form of two coaxial tubular members, one of smaller diameter than the other, and in simultaneously continuously extruding, in the direction of the common axis of the two tubular members, the plastics material constituting the core through a nozzle which rotates around said common axis in the space between the two tubular members, and constraining the three components emerging from the three nozzles to pass into a common coaxial annular passage or chamber in which they are welded together to form the tube, which emerges from the said passage or chamber. It is clear that by regulating the rotational speed of the rotating nozzle and the speed of extrusion therethrough, the core can be coiled in a helix having any desired pitch.

The invention also consists in an extruder head for the manufacture of tubes of plastics materials according to the above method, said head having at least two inlets for plastics materials, and comprising a fixed cylindrical shaft surrounded by a fixed sleeve which is concentric with said shaft and has a larger diameter whereby to provide an annular space therebetween, a bush rotatably mounted coaxially in said annular space and having a nozzle outlet in its end through which plastics material will be extruded as the bush rotates, said nozzle outlet communicating by means of channels and ducts with one of the inlets in the head through which the more rigid plastics material is fed, there being annular spaces between the nozzle outlet end of the bush and the shaft and between said end of the bush and the sleeve defining two concentric annular nozzles, coaxial with the shaft which communicate by means of channels and ducts with the second inlet in the head through which the softer plastics material is fed, means being provided for rotating the bush continuously during the simultaneous extrusion of the two tubular members and the interposed core, and an annular passage in front of the nozzle end of said bush through which the extruded tubular members and the core pass to cause them to weld together.

In order that the invention may be more clearly understood reference will now be made to the accompanying drawing, which shows by way of example, an axial section of one possible embodiment of an extruder head according to the invention.

The apparatus shown comprises a fixed hollow head 2 provided with two inlets for plastics material shown diagrammatically at 3 and 4, which can be connected respectively with the two extrusion presses supplying the plastics materials under pressure which are to be extruded. A central shaft 5 is fixed to a cap 6 on the head by means of a bolt 7 and lock washer 8. A bush 9 is rotatable on the shaft 5 in the space between the shaft 5 and a sleeve 10 fixed to the head 2. The bush 9 which is carried on bearings 11, 12, 13 is rigidly fixed to a toothed pinion 14 which is driven from a geared motor (not illustrated). The bush terminates at its outlet or lower end in an annular projection 19, within the thickness of which is formed a nozzle 15, the outlet 15*a* of which has a section substantially the same as that of the core to be extruded and has it axis parallel to the axis of the shaft 5. It communicates, through the passage 15*b* which opens in the side wall of the bush, with the open collecting channel 16 which is formed in the fixed sleeve 10 and communicates, in its turn, through the ducts 17, 18, with the inlet 3 for the more rigid plastics material.

The second inlet 4 for the less rigid plastics material communicates with a first annular collecting channel 20, the function of which is to distribute the plastics material uniformly around the entire circumference of the head, the material then passing by way of the annular collecting channel 21 and, by way of the holes 23 formed in the annular projection 19 of the bush 9, into the collecting channel 22, the two collecting channels 21 and 22 having the function of feeding the two annular nozzles 24, 25 formed by the intermediate spaces between the walls of the annular projection 19 and the outer wall of the shaft 5, and the inner wall of the female part 26 respectively.

By causing the bush 9 to rotate and by feeding the more rigid plastics material for the core through the inlet 3 and the more plastic and fluid plastics material which is to constitute the walls of the tube through the inlet 4, a filamentary core material will be extruded from the rotating nozzle 15, which owing to the rotation and the forward movement assumes the form of a helix, while from the annular nozzles 24 and 25 there will be extruded two tubular members with continuous walls, the helical core formed by the nozzle 15 being disposed between said tubular members. The welding together and perfect cohesion between the two tubular members and the helical core is effected in the chamber 28 below the nozzles, as a result of the fluidity of the material of the two tubular members and the residual pressure, so that there emerges from the outlet 29 of the head a monolithic tube, within the thickness of the wall of which a helical core is embedded.

The terminal portion of the head 2 is formed by two superimposed but independent collars, one 26 corresponding with the annular nozzle 25 (of which it forms one of the walls), the other 27 corresponding with the chamber 28 leading to the outlet 29, the axes of said collars being easily shifted in relation to the axis of the head by means of radial adjusting screws shown at 30 and 31. Adjustment of the collar 26 makes it possible to compensate any differences in thrust on the circumference of the two tubular members, while adjustment of the collar 27 permits compensation of any differences in thickness in the tube wall which may occur before it reaches the outlet.

The various parts constituting the head can be locked together by means of a locking ring 30.

Different variants can be introduced in accordance with the requirements of the product in the above-described extruder head, without thereby going beyond the scope of the invention.

Thus, for example, the bush 9 can be provided with more than one nozzle, all communicating with the same collecting channel 16, in order to produce a core with multiple helical elements. Also, it is possible to provide the bush with two or more nozzles fed from two or more inlets with different and/or differently coloured plastics materials in order to obtain tubes with multiple cores of different colours.

The following may be mentioned as some of the advantages offered by the present invention:

(a) Possibility of producing the tube with one or more helical cores; all that is necessary for this purpose being to provide the rotating bush with one nozzle or several nozzles which are preferably equiangularly spaced around the bush;

(b) Possibility of having two or more cores of differently coloured material, achieved by feeding material of different colurs to the two or more nozzles;

(c) Possibility of varying the pitch of the core helix by varying the speed of the rotating nozzle, the other conditions being the same, and hence without having to vary either the thickness or the diameter of the tube to correspond;

(d) Possibility of producing continuous tubing of indefinite length since it is not necessary for the tube to be supported at the outlet of the extruder head by a mandrel or the like, all that is required being a hauling device, known per se, acting on the outer surface of the formed tube.

I claim:

1. Method of manufacturing a tube having inner and outer walls of a first plastic material and a helical reinforcing coil of a second plastic material of stronger or more rigid characteristics than said first plastics material embedded between said inner and outer walls, which method comprises the steps of:

continuously extruding the first plastic material as two circumferentially continuous concentric cylindrical sheaths which form said inner and outer walls, said sheaths being extruded through two concentric nozzles formed between a rotatable intermediate cylindical member and stationary inner and outer cylindrical members coaxial therewith, simultaneously extruding said second plastic material in the direction of the common axis of said cylindrical members through a nozzle in said intermediate cylindrical member which revolves in a circular path about said common axis between said stationary inner and outer cylindrical members to form the helical reinforcing coil as a consequence of the revolution and forward motion of the extruded second plastic material, and constraining said walls and helical coil as they emerge from said nozzles to pass in their still heat-softened condition into a common coaxial annular passage in which they are welded together to form said tube.

References Cited

UNITED STATES PATENTS

| | | | |
|---|---|---|---|
| 2,810,424 | 10/1957 | Swartswelter et al. | 264—173 |
| 3,281,897 | 11/1966 | Mercer | 264—209 |
| 3,372,920 | 3/1968 | Corbett et al. | 264—173 |

FOREIGN PATENTS

| | | |
|---|---|---|
| 1,331,285 | 8/1962 | France. |

ROBERT F. WHITE, Primary Examiner

J. R. THURLOW, Assistant Examiner

U.S. Cl. X.R.

264—209; 18—13, 14